Sept. 1, 1931.     J. J. BARRY     1,821,201
MEANS FOR WASHING AND BRINING FISH
Filed March 17, 1927
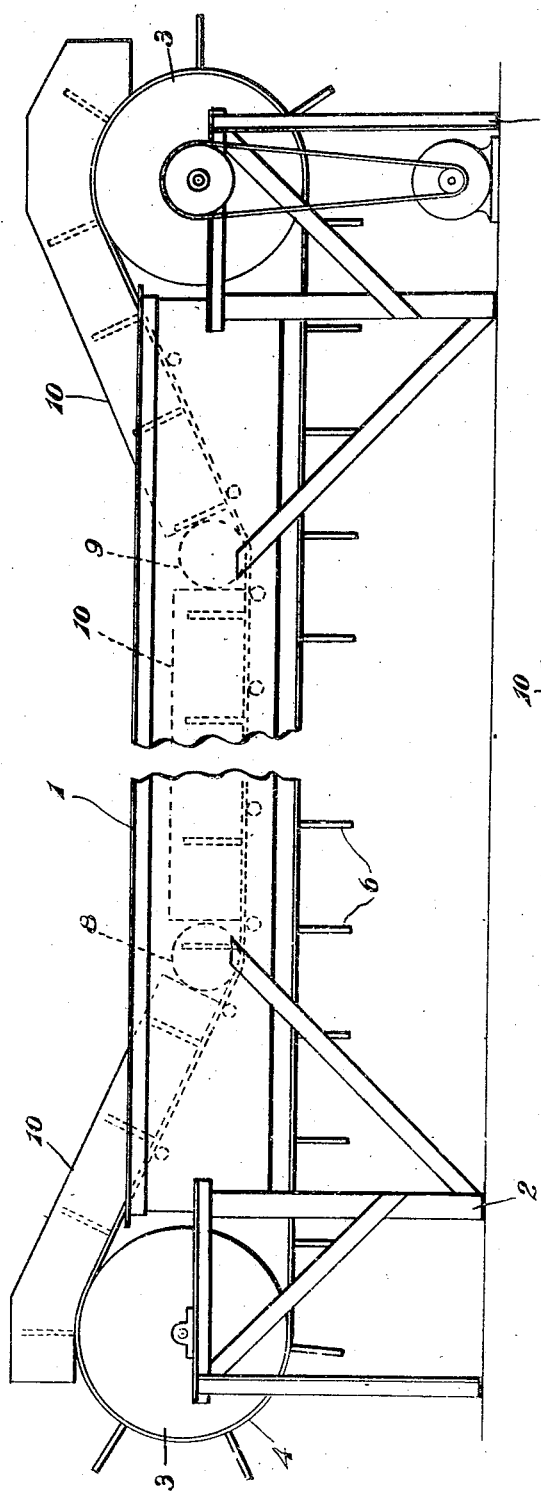
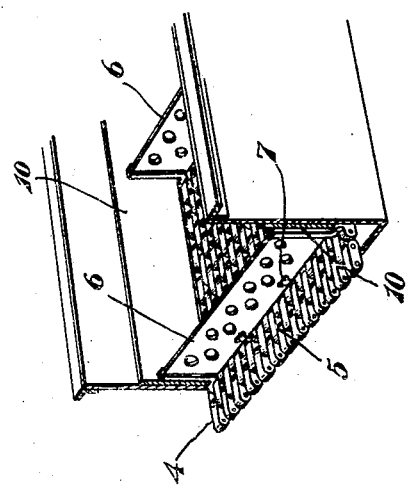

Patented Sept. 1, 1931

1,821,201

UNITED STATES PATENT OFFICE

JAMES JOFFREE BARRY, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

MEANS FOR WASHING AND BRINING FISH

Application filed March 17, 1927. Serial No. 175,971.

This invention relates to means for washing and brining fish.

The objects of the invention are to provide a means and devise a method of washing and brining fish which will proceed uninterrupted, without delays or injuries to the fish or the apparatus, and which will thoroughly perform the desired function; to obtain a regularity of operation so that all of the fish will be equally affected by the brining; to agitate the brine sufficiently to obtain proper impregnation of the fish therewith; to prevent the fish from bunching together; to enable a large quantity of fish to be in the brine at one time and discharged therefrom in the same sequence in which introduced into the brine; to avoid jamming or stoppage of the apparatus by wedging of fins or the like therein; to avoid sliding the fish on hard surfaces such as the tank bottom or runways into or out of the tank; to secure simplicity of construction and operation; and to obtain other advantages and results as may be brought out in the following description.

Referring to the accompanying drawings in which like numerals of reference indicate similar parts throughout the several views:—

Figure 1 is a side elevation of an apparatus embodying my invention; and

Figure 2 is a perspective view of a portion of the tank and conveyor constituting parts of the invention.

In the specific embodiment of the invention illustrated in said drawings, the reference numeral 1 indicates a tank of considerable length having the usual bottom, sides and ends so as to retain a proper depth of liquid, such as water or brine through which the fish are to be passed. This tank 1 may be supported by any suitable legs 2 as found convenient or necessary in the construction and use of the apparatus.

At opposite ends of the tank 1, outside of the same, I have shown wheels 3, 3, over which passes a conveyor 4, as shown. Preferably the construction and arrangement is such that the conveyor is of a continuous type, and for convenience, the reach thereof which passes through the tank will be considered the advancing or forward reach, and the other reach thereof will be termed the return reach. As shown, I prefer that the return reach shall pass beneath the tank, and consequently I pass the forward reach over the wheels 3 and thence downwardly and under the same to the return reach. This, however, may be varied as found most expedient or desirable.

The conveyor 4 is composed of an openwork belt 5 which is continuous to form the upper or forward reach and the lower or return reach, said belt being the full width of the tank as clearly shown in Figure 2. The detail construction of the belt is not deemed of material interest herein aside from the qualifications that it be flexible longitudinally, be of uniform width, quite rigid transversely, and of mesh or open construction to admit passage therethrough quite freely of liquid and particles of solid matter carried in suspension by the liquid. It is therefore considered within the scope of the invention to employ a wire mesh flexible belt, or any other suitable construction of belt fulfilling the requirements. At intervals along this belt are transverse members or flights 6 which also extend from side to side of the tank, and, with the belt as the bottom, form basket-like compartments with the side of the tank constituting the sides of the compartments. It may be opportune to observe here that fish introduced into any one compartment at the forward or feed end of the apparatus remain in that compartment until they reach the other or discharge end of the apparatus, it being understood that in operating the apparatus the brining fluid is of a depth to substantially but not completely submerge the flights 6. Also, the tendency of the fish, which are more or less afloat, is to turn cross-wise of the tank and rest on the belt against the advancing flight. Consequently, only the tip of the nose or tail will contact with the sides of the tank, and the contacting part of the fish will substantially all be against the belt and flights with which the fish has no relative movement as it is carried from end to end of the tank. This is an important consideration in the handling of fish, as they are naturally quite slippery, and as they slide around, the thin parts, such as the fins, are apt to become wedged between two relatively moving parts of an apparatus. In the present construction, likelihood of any such wedging is overcome by the use of a belt extending the width of the tank and flights secured to the belt with no relative movement between.

As shown, the flights are preferably carried at opposite ends by specially constructed links forming part of the belt, and are likewise secured intermediate of the ends of the flights to the belt, as at 7, so as to positively prevent the fish fins or other parts becoming wedged therebetween.

The major portion of the conveyor within the tank 1 lies parallel to the bottom of the tank, or substantially so, the end portions only of the forward reach sloping into and out of the tank over the end walls thereof. Suitable wheels riding on the top of the belt at the edges thereof obtain the deflection of the belt from the horizontal to the sloping portions, a wheel 8 being shown at the forward end of the tank and a wheel 9 being shown at the rearward end thereof. Obviously, however, as many wheels as desired, both above and below the belt may be employed without affecting the spirit or scope of the invention.

In carrying out the mechanical details of construction necessitated by the use of said wheels above the belt, it is necessary to make the flights shorter than the full width of the belt to enable said flights to pass the wheels. Extending longitudinally of the tank on the side walls thereof, and of substantially the same thickness as the thickness of the wheels, are filler strips 10. These strips are shown of a depth substantially that of the flights with the bottom edges adjacent the belt. The ends of the flights are substantially in sliding contact with said strips 10, said strips constituting the portion of the side walls of the tank which confines the fish from passing around the ends of the flights as the belt advances.

It is to be observed, that in operation, the fish to be washed or brined or both, are introduced at the forward end of the apparatus into successive divisions defined by the flights, and the fish remain within such divisions respectively until the opposite end of the apparatus is reached and the fish discharged. Accordingly, an even brining of the fish may be obtained, for they all remain immersed for equal lengths of time. Likewise, the apparatus prevents the fish from "bunching" and then of a sudden a great many discharging at once. The apparatus enables the fish to be lowered into the liquid without splashing and as the fish are carried forward, the flights cause sufficient agitation of the liquid to wash and properly brine the fish. As illustrated, the conveyor is supported within the tank in a position spaced from the bottom thereof and the fish are thereby held suspended away from the sediment and dirt which settles through the conveyor to the bottom of the tank. After thus passing through the brining fluid, the fish are finally elevated from the tank and discharged. This is all effected without necessitating a sliding of the fish along the tank bottom or sides or on runways into or out of the tank, thus both avoiding possible injury to the fish and a possible injury to or stoppage of the apparatus by wedging of the fish or otherwise.

While in the foregoing description, and in the following claims, I make use of the term "fish", I wish it to be understood that I employ that word in its generic sense inclusive of fish as they come from the water, fish which have been wholly or partly dressed, or fish in the form of fillets, and so on.

Obviously detail changes and modifications may be made in the construction and use of my invention, and I do not wish to be understood as limiting myself to the exact structure shown or described or to the precise steps or order thereof mentioned, except as set forth in the following claims when construed in the light of the prior art.

Having thus described the invention, I claim:—

1. An apparatus for brining fish, comprising a tank, a continuous conveyor having one reach thereof extending downwardly thereinto and extending in a substantially horizontal direction throughout a portion of the tank and in spaced relation from the bottom thereof, and a plurality of relatively spaced and upwardly extending flights carried by the conveyor and extending transversely thereof into close proximity to the opposite sides of the tank, the conveyor and flights being of perforate construction whereby brining liquid and relatively small particles can pass therethrough and the flights being of a height to permit a substantial brining depth of liquid on the conveyor without entirely submerging the flights.

2. An apparatus for brining fish, comprising a tank, a continuous conveyor having its upper reach extending downwardly thereinto, means within the tank holding an extended portion of the conveyor in substantially horizontal position therein and spaced from the bottom thereof, and a plurality of relatively spaced and upwardly extending flights carried by the conveyor and extending transversely thereof into close proximity to the opposite sides of the tank, the conveyor and flights being of perforate construction whereby brining liquid and relatively small particles can pass therethrough and the flights being of a height to permit a substantial brining depth of liquid on the conveyor without entirely submerging the flights.

3. An apparatus for brining fish, comprising a tank, a continuous conveyor having one reach thereof extending downwardly thereinto, relatively spaced rotary wheels adjacent to the inner side walls of the tank holding an extended portion of the conveyor in a substantially horizontal position therein and spaced from the bottom thereof, filler strips on the side walls of the tank between and adjacent the wheels and of a thickness substantially equal to that of the wheels, and a plurality of relatively spaced and upwardly extending flights carried by the conveyor and extending transversely thereof into close proximity to the said strips on the opposite sides of the tank, the conveyor and flights being of perforate construction whereby brining liquid and relatively small particles can pass therethrough and the flights being of a height to permit a substantial brining depth of liquid on the conveyor without entirely submerging the flights.

4. An apparatus for brining fish, comprising a tank having side and end walls and a fixed bottom, a continuous perforate conveyor having a reach sloping downwardly into the tank at one end thereof and sloping upwardly out of the tank at the other end, the conveyor portion between said slopes being substantially horizontal and spaced from the bottom of the tank, and transverse perforate flights mounted in relatively spaced relation on the conveyor and extending outwardly therefrom in a direction and to such an extent that a substantial depth of brining liquid is permitted on the said horizontal portion of the conveyor without entirely submerging the flights, each flight forming a continuous barrier from end to end and the ends thereof being in close proximity to the sides of the tank whereby to prevent passage of fish thereby but being sufficiently perforate to permit a flow of liquid therethrough.

JAMES JOFFREE BARRY.